N. BRAIBANT.
ELASTIC WHEEL.
APPLICATION FILED SEPT. 25, 1909.
1,033,664.
Patented July 23, 1912.
2 SHEETS—SHEET 1.
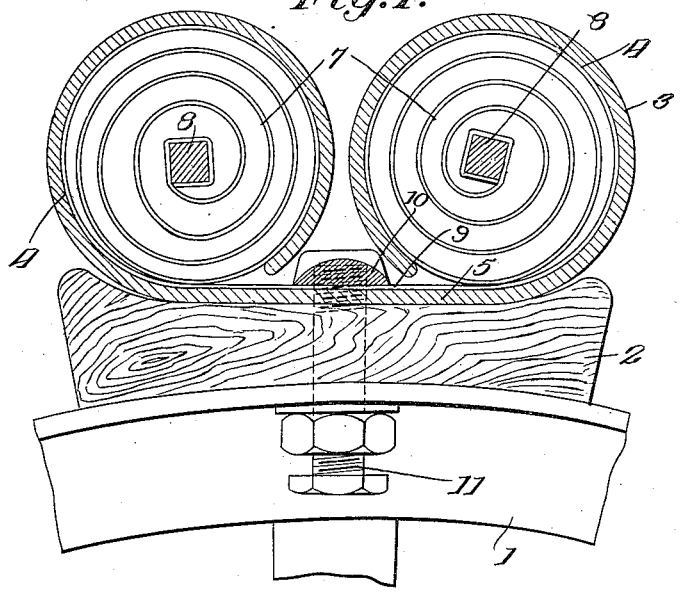
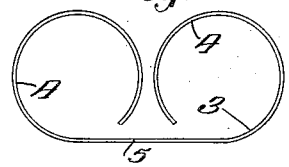
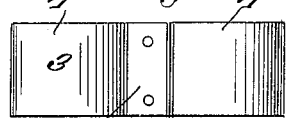
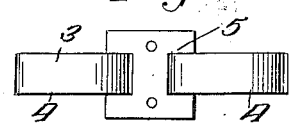
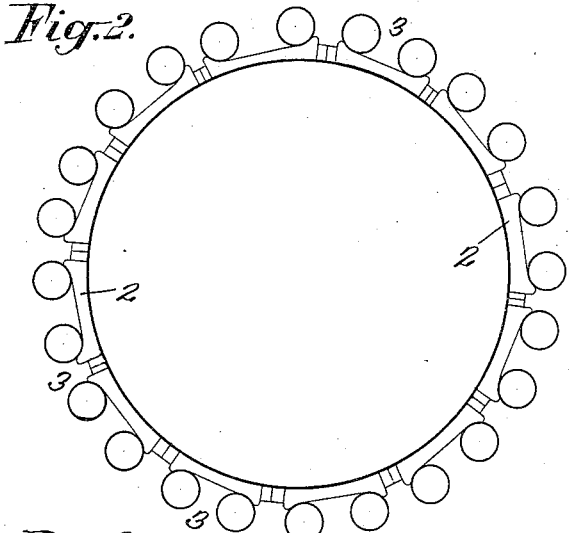
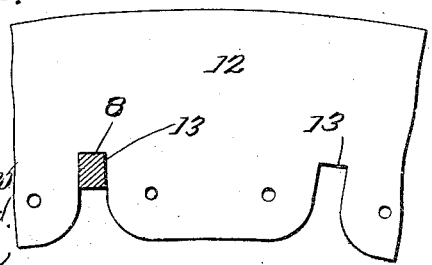
COLUMBIA PLANOGRAPH CO., WASHINGTON, D. C.

N. BRAIBANT.
ELASTIC WHEEL.
APPLICATION FILED SEPT. 25, 1909.
1,033,664.
Patented July 23, 1912.
2 SHEETS—SHEET 2.
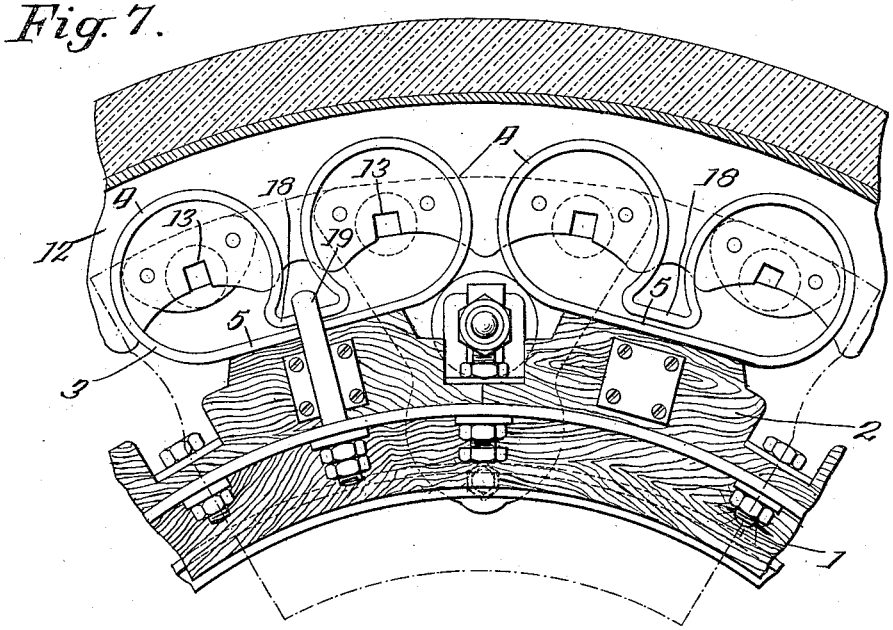
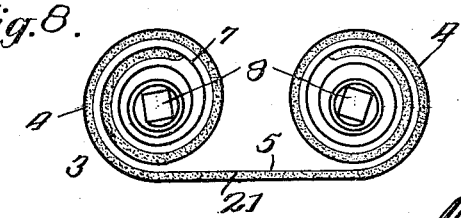

UNITED STATES PATENT OFFICE.

NESTOR BRAIBANT, OF BRUSSELS, BELGIUM.

ELASTIC WHEEL.

1,033,664. Specification of Letters Patent. Patented July 23, 1912.

Application filed September 25, 1909. Serial No. 519,635.

*To all whom it may concern:*

Be it known that I, NESTOR BRAIBANT, a subject of the King of Belgium, and resident of Brussels, Belgium, have invented certain new and useful Improvements in Elastic Wheels, of which the following is a specification.

This invention relates to improvements in elastic wheels.

The object of the invention is to provide a plurality of springs on the rim of the wheels, and secured to elements carried by the tire, whereby to receive the shock incident to the rotation of the wheel.

The invention also relates to improvements in the details of construction and arrangement of parts to be hereinafter described and particularly pointed out in the claims.

In the drawings: Figure 1 is a side elevation, partly in section, of a portion of my improved wheel, the tire being removed. Fig. 2 is a diagrammatic view of a wheel, to illustrate the position of the springs, the tire being removed. Fig. 3 is a detail side elevation of one of the spring housings. Fig. 4 is a plan view of one of the springs. Fig. 5 is a similar view of one of the springs, but of less width than that shown in Fig. 4. Fig. 6 is a detail side elevation of the tire. Fig. 7 is a side elevation partly in section of a modification. Fig. 8 is a detail side view of one of the springs, lined with leather.

1, indicates the rim of a wheel, on which is seated a plurality of blocks 2. On each block is mounted a housing 3, open at its sides and formed with circular end portions 4—4 connected by a flat base 5. The inner adjacent ends of the circular end portions are open as indicated in Fig. 1, or they may be connected as shown in Fig. 7.

In the circular end portions are the convolutions of a spring 7, the ends of which are secured to cross bars 8. The convolutions are connected by a straight portion 9, which rests on the base 5, of the housing, and is secured to the latter by a cross bar 10, secured by bolts 11. These bolts pass through the blocks 2, and rim 1, and serve to secure the parts together.

The springs 7, may be of the same width as the housing, or they may be much narrower than said housing as shown in Fig. 5.

Fitting over the housing is a U-shape tire 12, which may or may not have a resilient tread. The inner edges of the sides of the U-shaped tire are formed with notches or seats 13, to receive the square cross bars 8, to which the ends of the springs are secured.

In the form of the invention disclosed in Fig. 7, the inner ends of the curved portions 4, of the housing are connected as shown at 18, the fastening means indicated at 19, engaging the connected portion 18, as clearly shown.

It may be found desirable to line the springs with leather, as indicated at 21, in Fig. 8, to assist in deadening the noise and at the same time protect the metal.

In operation, as the wheel is rotated, load pressure is applied, the cross bars 8 are forced in toward the center of the wheel, and the springs receive the shock. By arranging the parts as described, the entire shock is distributed throughout the spring, consequently relieving the parts of the wheel of sudden jars or undue strain.

What I claim is:—

1. A wheel including a rim, blocks mounted on the rim, housings having enlarged portions, spiral springs in the enlarged portions, means for securing the housings and the blocks to the rim, cross bars extending through the enlarged portions, and to which the spiral springs are attached, and a tire provided with inwardly extending flanges having slots in the edges into which fit the ends of the cross bars.

2. In combination, a wheel including a rim, blocks secured to the rim, housings having enlarged curved end portions mounted on the blocks, a spring in each housing, each spring having its end portions spirally formed and inclosed in the curved portions of each housing, a cross bar extending through each enlarged curved portion of the housings, and a tire fitting over the housings and engaging the end portions of the cross bars.

3. In combination, a wheel, housings supported on the wheel, each housing including enlarged circular end portions and a narrow intervening portion, a spring inclosed in each housing, each spring being formed of flat metal and having its ends spirally formed, the spirally formed ends of the spring fitting in the circular portions of each housing, means securing the housing and the spring to the wheel, said means being located between the two circular enlarged ends of each housing, rods extending through the circular enlarged end portions, and a tire formed with slots in which the ends of the cross bars engage.

In testimony whereof I have hereunto set my hand in presence of two witnesses.

NESTOR BRAIBANT.

Witnesses:
C. van Velsen,
Gregory Phelan.

Copies of this patent may be obtained for five cents each, by addressing the "Commissioner of Patents, Washington, D. C."